(12) United States Patent
Calloway (10) Patent No.: US 8,672,116 B2
(45) Date of Patent: Mar. 18, 2014

(54) SPRUNG PIN CONVEYOR ROLLER BEARING

(75) Inventor: Britt Calloway, Fredericksburg, VA (US)

(73) Assignee: Bastian Automation Engineering, LLC, Indianapolis, IN (US)

( * ) Notice: Subject to any disclaimer, the term of this patent is extended or adjusted under 35 U.S.C. 154(b) by 0 days.

(21) Appl. No.: 13/241,528

(22) Filed: Sep. 23, 2011

(65) Prior Publication Data

US 2013/0075225 A1 Mar. 28, 2013

(51) Int. Cl.
  *B65G 13/00* (2006.01)
(52) U.S. Cl.
  USPC ............................................ 193/37; 193/35 R
(58) Field of Classification Search
  USPC ............................................................ 193/37
  See application file for complete search history.

(56) References Cited

U.S. PATENT DOCUMENTS

| 3,353,644 A | 11/1967 | McNash et al. |
| 3,610,404 A | 10/1971 | Fleischauer et al. |
| 4,577,747 A | 3/1986 | Martin |
| 4,664,243 A * | 5/1987 | Martin ............................. 193/37 |
| 4,681,215 A * | 7/1987 | Martin ............................ 198/843 |
| 5,217,099 A | 6/1993 | Marcus et al. |
| 5,421,441 A | 6/1995 | Mason |
| 5,421,442 A * | 6/1995 | Agnoff ............................. 193/37 |
| 5,865,290 A * | 2/1999 | Scott ................................ 193/37 |
| 6,053,298 A * | 4/2000 | Nimmo et al. ................... 193/37 |
| 6,523,665 B2 | 2/2003 | Nimmo et al. |
| 6,547,054 B2 * | 4/2003 | Gamache ......................... 193/37 |
| 6,554,117 B2 * | 4/2003 | Henson et al. ................... 193/37 |
| 6,702,091 B2 * | 3/2004 | Nimmo et al. ................... 193/37 |
| 6,782,996 B1 * | 8/2004 | Wolf ......................... 198/781.02 |
| 6,969,199 B2 * | 11/2005 | Moshammer ................... 384/57 |
| 7,028,825 B2 * | 4/2006 | Scott ................................ 193/37 |
| 7,181,845 B2 | 2/2007 | Roessler et al. |
| 7,299,909 B1 | 11/2007 | Houghton |
| 2001/0002643 A1 * | 6/2001 | Nimmo et al. ................... 193/37 |
| 2005/0201647 A1 | 9/2005 | Kuroda et al. |
| 2007/0181400 A1 | 8/2007 | Evans |
| 2009/0045029 A1 * | 2/2009 | Deur ................................ 193/37 |

\* cited by examiner

*Primary Examiner* — Ramya Burgess
*Assistant Examiner* — Thomas Randazzo
(74) *Attorney, Agent, or Firm* — Woodard, Emhardt, Moriarty, McNett & Henry LLP (57) ABSTRACT

A roller bearing end hub has a housing that internally houses a plane bearing, pin, and spring. The spring is biased against the plane bearing which is rotatably connected with the pin. The housing includes two half-housings which are configured to be mated together. The bearing is formed of a shape similar to the housing interior. The pin is smaller than an attached axle stub and the spring does not directly interact with the pin such that the amount of friction between the pin and bearing is minimized.

43 Claims, 11 Drawing Sheets

SPRUNG PIN CONVEYOR ROLLER BEARING

BACKGROUND

Roller conveyors are widely used to efficiently transport items. There are generally two types of conveyor rollers used in industry: roller bearing and plain bearing or "pin bearing". Of the pin bearing rollers, there are two types: a non-sprung (i.e., no spring) pin bearing type and a sprung (i.e., with spring) pin bearing type. The non-sprung pin bearing has low friction such that the roller can easily rotate, but it cannot be easily inserted into the conveyor because it has to be assembled with the conveyor frame. In contrast, the sprung pin bearing design can be readily inserted and replaced in the conveyor frame because the spring allows the axle stub to retract and provide linear clearance for inserting the roller into the frame. However, the sprung pin has a large diameter that creates higher friction, which in turn causes power losses. Moreover, additional frictional losses are created by the spring engaging the pin. These designs also require the use of a large number of components that increase their expense and make servicing the roller more difficult. Manufacturing these designs can be rather difficult because the bearing housing limits the availability of certain radial features.

Thus, there is a need for improvement in this field.

SUMMARY

The systems and methods described herein address several of the issues mentioned above as well as others. The conveyor roller bearing system allows the roller to be easily installed and at the same time provides low friction. Moreover, it is less expensive because it only has four main components, an axle stub, a bearing, a spring, and a bearing housing.

The axle stub includes a hex head that engages the conveyor frame and a small diameter pin that is received in the pin bearing. With the small diameter pin, lower friction losses are created at the smaller diameter. The bearing is biased by a spring to further reduce friction while at the same time allows the axle stub to retract to facilitate installation. The housing utilizes a clamshell design that allows radial features to be easily formed. The pin bearing is keyed in such a manner to only be able to move in a linear direction to facilitate extension or retraction of the axle stub. With the bearing able to move along with the axle stub during extension and retraction, a number of issues associated with previous sprung type designs, such as bearing wear and axle warping, are reduced.

In one particular example, a conveyor roller includes a roller tube having end hubs at both opposing ends of the roller tube. Each end hub includes a housing having an internal cavity which is keyed to a bearing. The bearing fits within the cavity and is biased by a spring. The bearing contains a channel which receives a pin. The pin is a small diameter pin and is rotatable with respect to the bearing. The pin is attached to a stub axle which is formed to fit into a support structure. In one example, the bearing has a hexagonal cross-sectional shape that is received in a similarly shaped cavity. The stub axle, pin, and bearing are retractable within the housing as the spring compresses.

Further forms, objects, features, aspects, benefits, advantages, and embodiments of the present invention will become apparent from a detailed description and drawings provided herewith.

DETAILED DESCRIPTION

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on.

Figure 1:
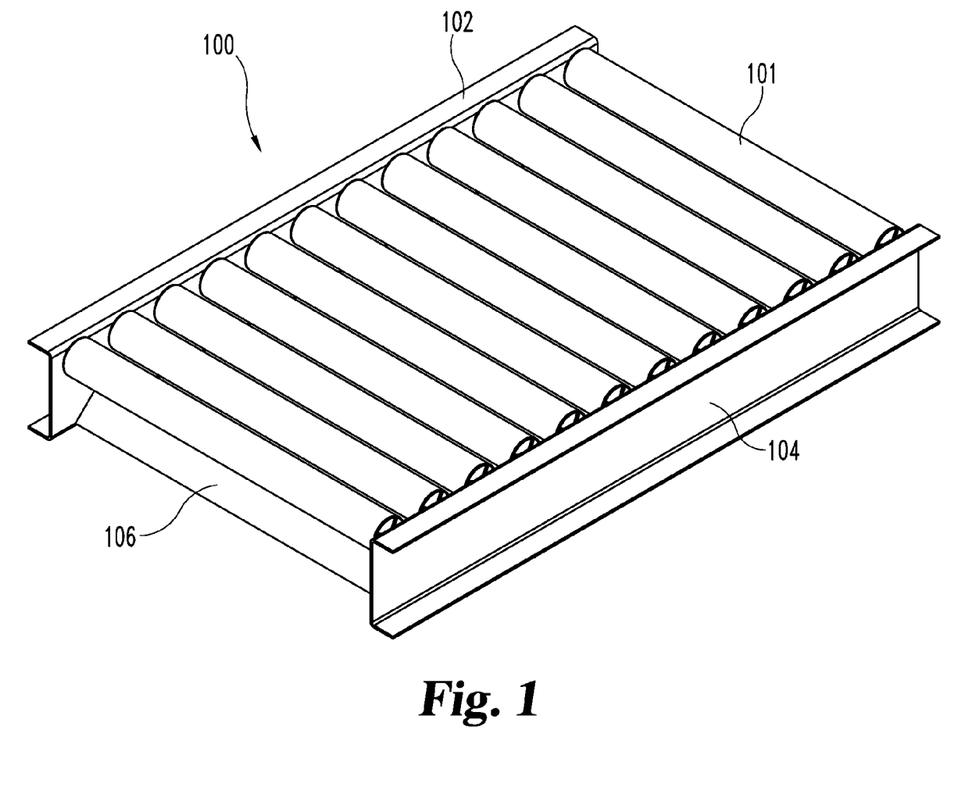
FIG. 1 is a perspective view of a roller conveyor system.

FIG. 1 shows a perspective view of one example of a conveyor system 100. The conveyor system 100 includes one or more rollers 101 supported by a frame 102. The frame 102 includes one or more rails 104 between which the rollers 101 extend and one or more cross-beams (or cross-supports) 106 that join the rails together. In the illustrated embodiment, the rails 104 include elongated c-shaped beams that are arranged in a parallel configuration, but it should be recognized that the rails can be configured differently in other embodiments. For example, the rails 104 can be curved in other embodiments. As can be seen, the rollers 101 are rotatably mounted to the rails 104 such that an item placed on conveyor system 100 can travel in a direction generally transverse to the axes of rollers 101. In the depicted embodiment, the conveyor system 100 is a gravity type conveyor, but in other examples, the conveyor system 100 can be a powered type conveyor. In still yet other variations, the rollers 101 can be incorporated into other types of conveyor systems, such as in belt conveyors.

Figure 2:
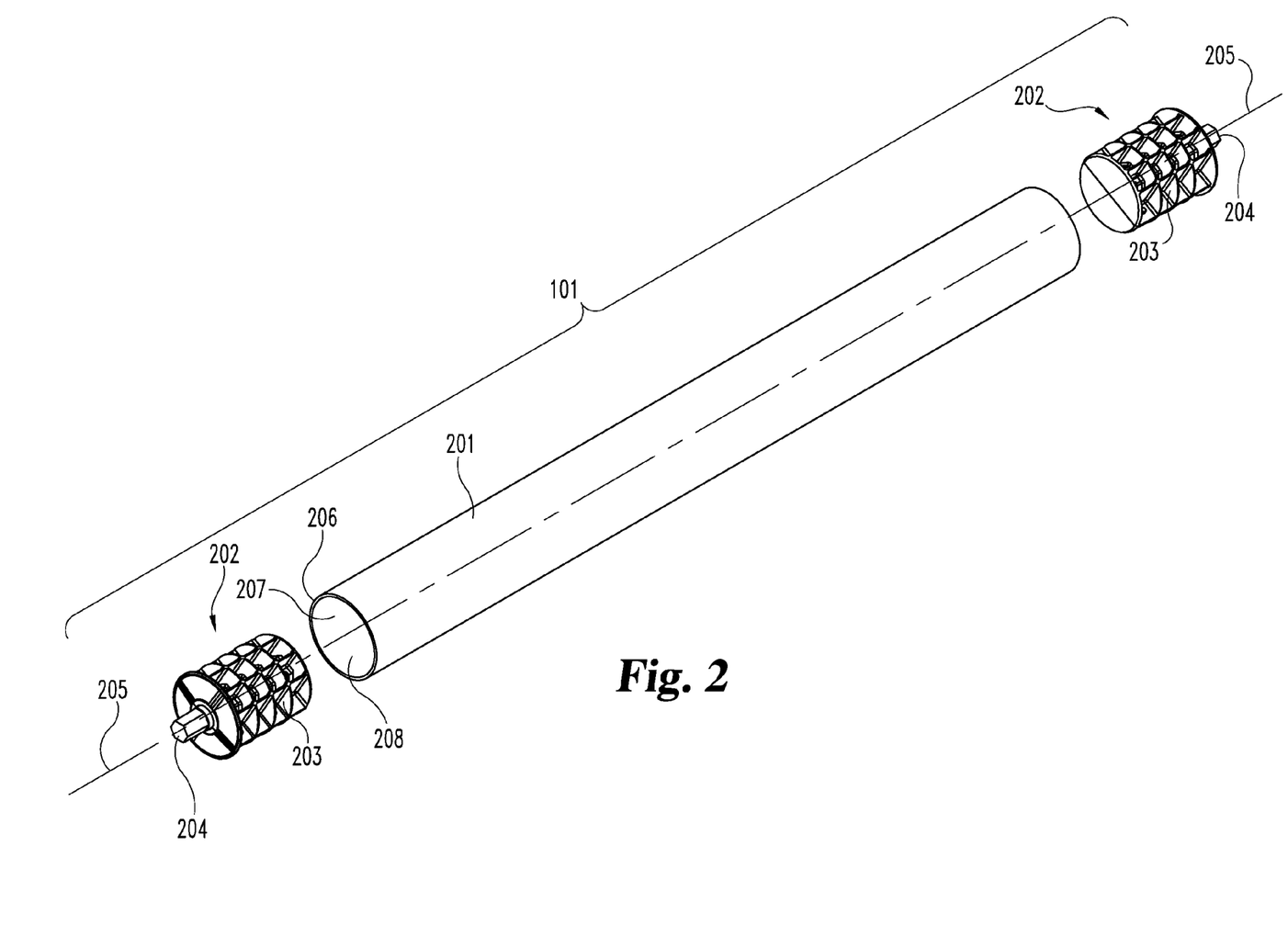
FIG. 2 is an exploded view of a roller from the FIG. 1 roller conveyor system.

FIG. 2 shows an exploded view of one of the rollers 101. Each roller 101 includes a roller tube 201 and one or more end hubs 202 that are configured to engage the rails 104. As shown, the end hubs 202 are located at opposing ends of roller tube 201. In the illustrated embodiment, the roller tube 201 is the form of a hollow cylindrical tube, but the roller tube 201 can be shaped differently in other embodiments. For instance, the roller tube 201 can be partially or wholly solid and/or include grooves or other features for receiving drive belts and the like. In other examples, the outer surface of the roller tube 201 is bowed or concave in shape for guiding belts or items along the rollers 101. In one example, the roller tube 201 is made from a metal, such as aluminum and/or steel, but it should be recognized that the roller tube 201 can be made from other materials. Each hub 202 includes a housing 203 and an axle stub 204 that is configured to engage one of the rails 104. To provide clearance for facilitating insertion of the roller 101 into the frame 102, the axle stub 204 is able to move in a telescoping fashion relative to the housing 203 of the hub 202. In the illustrated embodiment, both hubs 202 have axle stubs 204 that are able to move in a telescoping fashion. However, in other examples, only one of the hubs 202 has an axle sub 204 that is able to move in a telescoping fashion, while the other axle stub is fixed such that it is unable to move in a telescoping fashion. The axle stub 204 is also configured to rotate relative to the housing such that the roller 101 is able to rotate about an axis 205. Each end of the roller tube 201 has an end face 206 that surrounds a hub opening 207 in which a corresponding end hub 202 is received. The roller tube 201 in the depicted embodiment is hollow such that a cavity 208 extends between the hub openings 207.

Figure 3:
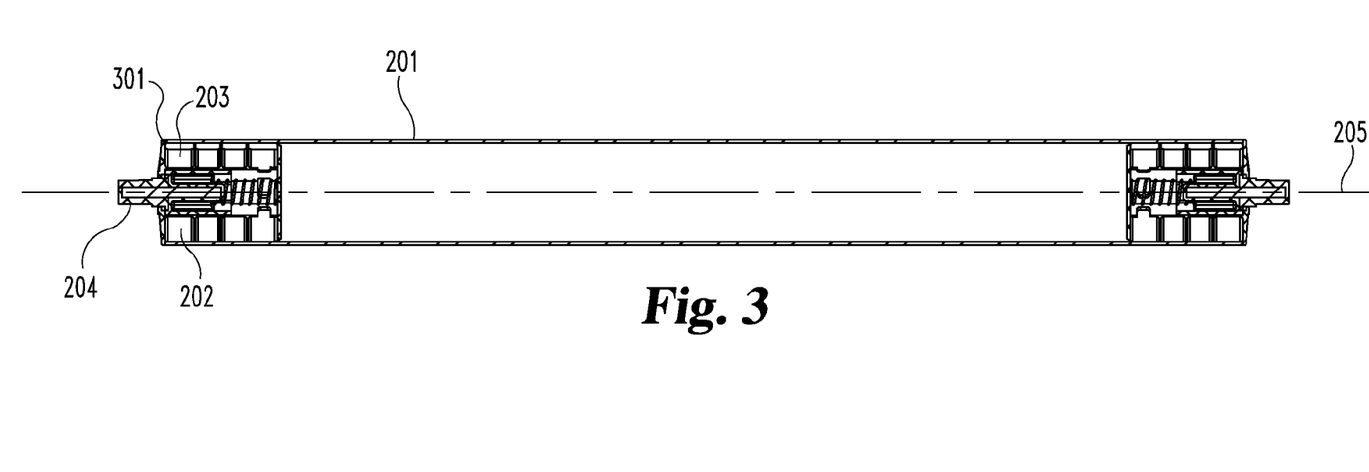
FIG. 3 is a cross-sectional view of the FIG. 2 roller.

Referring to FIG. 3, which shows a cross-sectional view of the roller 101, the housing 203 of end hub 202 is slidably insertable into opening 207 of roller tube 201 such that end hub 202 is substantially contained within roller tube 201. The housing 203 has an annular flange 301 that abuts against face 206 when end hub 202 is fully seated within roller tube 201. In this way, end hub 202 is prevented from sliding further into roller tube 201. In one example, the end hubs 202 are secured with a frictionally tight fit to the roller tube 201, but the end hubs 202 can be secured to the roller tube 201 in other manners, such as with an adhesive, crimping, and/or screws. While the housing 203 of the end hub 202 has a generally cylindrical shape so as to coincide with the shape of the opening 207 of the roller tube 201, the housing can have different shapes depending on the shape of the opening 207 and/or the roller tube 201 in other examples. For instance, the housing 203 of the end hub 202 can have a hexagonal shape when the opening 207 in the roller tube has a hexagonal shape. With the above-described design, the end hub 202 is able to be easily retrofitted to numerous existing roller conveyor designs.

Figure 4:
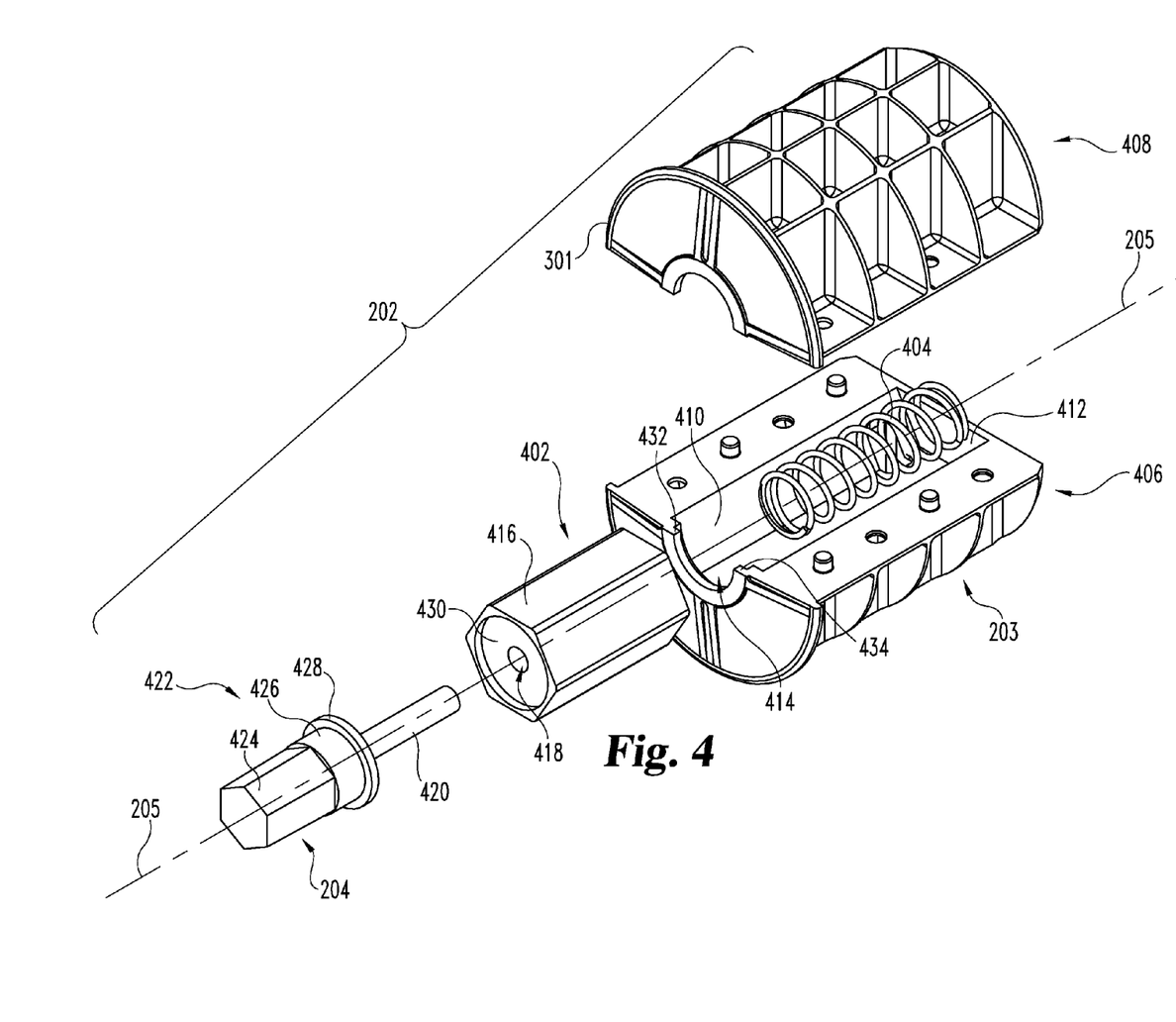
FIG. 4 is an exploded view of an end hub used in the FIG. 2 roller.

FIG. 4 shows an exploded view of the end hub 202. As depicted, the end hub 202 includes the housing 203, the axle stub 204, a bearing 402, and a spring 404. With this four-piece construction, the end hub 202 can be manufactured inexpensively and efficiently as compared to previous sprung-type roller designs. Looking at FIG. 4, the housing 203 includes a unique clamshell design in which the housing 203 is formed by clamping two (or more) shells 406, 408 together. The shells 406, 408 allow the various features of the housing 203 to be formed using a relatively inexpensive injection molding processes with a straight poll die and no "action" in the tool. In the illustrated embodiment, the two shells 406, 408 are generally interchangeable and for the purposes of discussion will be sometimes referred to collectively by reference number 406. With the two shells 406, 408 being identical, tooling costs can be reduced. However, the shells 406 can be shaped differently so as to not be interchangeable and/or require more shells 406 than illustrated to form the housing 203. Moreover, one (or more) of the shells 406, 408 can be larger than the other. The shells 406, 408 are configured to mate together so as to form a bearing cavity 410 in which the bearing 402 and spring 404 are received. At one end of the housing 203, the shells 406, 408 form a spring support wall 412 against which the spring 404 is biased. In the illustrated example, the spring support wall 412 closes the bearing cavity 410, but it is envisioned that in other examples the spring support wall 412 can be partially open while still supporting the spring 404. As should be further appreciated, other structures can be used besides the support wall 412 for supporting the spring 404, such as adhesives, flanges, and/or protrusions, to name just a few examples. Moreover, while the spring 404 is illustrated as a coil type spring, it should be appreciated that other types of springs and/or biasing mechanisms can be used, such as leaf springs, cantilever springs, tension springs, gas springs, hydraulic type biasing mechanisms, and/or torsion springs, to name just a few examples. Opposite the spring support wall 412, the shells 406, 408 together define an axle stub opening 414 through which the axle stub 204 extends. In other variations, the axle stub opening 414 is formed in only one of the shells 406, 408. For instance, instead of the shells 406, 408 being split longitudinally along the axis 205 (as is shown in FIG. 4), the shells 406, 408 in other embodiments are divided in a plane that is transverse to the axis 205 such that one of the shells 406, 408 defines the end of the bearing cavity 410 having the spring support wall 412, and the other shell 406, 408 defines the axle stub opening 414. In the bearing cavity 410, the spring 404 is sandwiched between the bearing 402 and the spring support wall 412. The spring 404 biases the bearing 402 so that the axle stub 204 is normally in an extended state relative to the housing 203 such that the axle stub 204 extends from the axle stub opening 414.

The bearing cavity 410 is shaped to generally match the cross-sectional shape of the bearing 402, but the bearing cavity 410 is longer so as to allow the bearing 402 to slide within the bearing cavity 410. In previous sprung type designs, the bearing was fixed and unable to move in a linear direction as the pin or axle was extended or retracted. This is turn can create the potential for a whole host of issues. For instance, any dirt or debris on the axle can form transverse grooves, striations, or other wear at the interface between the bearing and axle as the axle slides relative to the bearing, which in turn can create greater friction between the axle and bearing during rotation. Moreover, as the axle extends and retracts, different moment arms or loads are created between the bearing and the axle, and in turn, these differences can lead to problematic bending or warping of the axle and/or damage to the bearing. On the other hand, with the illustrated design, the bearing 402 is able to normally move linearly with the axle stub 204 during extension and retraction, thereby reducing these as well as other issues experienced with the previous designs. Generally speaking, an outer longitudinal surface 416 of the bearing 402 and the bearing cavity 410 are keyed with one another so that the bearing 402 is able to move in a linear direction along the axis 205 but is unable to rotate about the axis 205 (relative to the housing 203). In the example shown in FIG. 4, the bearing 402 and the bearing cavity 410 each have a substantially hexagonal prism shape, but the bearing 402 and bearing cavity 410 can be shaped in other manners that allow linear movement but not rotational movement of the bearing 402 relative to the housing 203. For instance, the bearing 402 and bearing cavity 410 can have a triangular, rectangular, pentagonal, and/or star-shaped cross-sectional shape, to name just a few examples, and/or can include keying and/or other structures that facilitate linear movement but prevent rotational movement of the bearing 402.

Looking at FIG. 4, the bearing 402 defines an axle pin opening 418 in which a pin 420 from the axle stub 204 is received. As can be seen, the axle stub 204 includes a head portion 422 from which the pin 420 extends. The head portion 422 includes a rail engagement section 424, a collar section 426, and a retention flange 428. The rail engagement section 424 is configured to engage the rail 104. In the illustrated embodiment, the rail engagement section 424 has a hexagonal shape, but the rail engagement section 424 can be shaped differently in other embodiments. The rail engagement section 424 can be tapered so as to eliminate noise created by rattling of the axle stub 204 in the axle pin opening 418. The collar section 426 has a cylindrical shape so as to facilitate rotation of the axle stub 204 in the axle stub opening 414 of the housing 203. The retention flange 428 is designed to retain the axle stub 204 along with the bearing 402 inside the housing 203. The retention flange 428 in FIG. 4 has a continuous disc shape, but it can be shaped differently in other embodiments. For instance, the retention flange 428 can be discontinuous and have notches. Around the axle pin opening 418, the bearing 402 defines a retention flange cavity 430 shaped and configured to receive all or part of the retention flange 428 of the axle stub 204. The retention flange cavity 430 in the illustrated embodiment has a cylindrical shape to match the shape of the retention flange 428 so as to facilitate rotation of the axle stub 204 relative to the bearing 402. In other examples, the retention flange cavity 430 is shaped differently than is illustrated in FIG. 4 or is eliminated. Around the axle stub opening 414, the housing 203 has an engagement flange 432 that is sized small enough to engage the retention flange 428 of the axle stub 204 but at the same is sized larger than the collar section 426 of the axle stub 204 so as to allow rotation of the axle stub 204 relative to the housing 203. The engagement flange 432 has a notch portion 434 that is sized and shaped to receive at least part of the retention flange 428 of the axle stub 204. In the illustrated embodiment, the spring 404 and the pin 420 of the axle stub 204 are made of steel, while the head portion 422 of the axle stub 204 along with the housing 203 and the bearing 402 are made of plastic. With the illustrated embodiment, the plastic-metal interface between the pin 420 of the axle stub 204 and the bearing 402 facilitates smooth rotation. These components can be made from different combinations of materials and/or different materials, however. In order to further reduce friction, the pin 420 of the axle stub 204 and the corresponding axle pin opening 418 in the bearing 402 have a diameter that is smaller than the diameter of the head section 422 of the axle stub. With the pin 420 being smaller than the head section 422, the end hub 202 experiences less friction as compared to conventional designs in which the axle generally has the same large diameter. In one particular example, the pin 420 of the axle stub 204 in FIG. 4 has an outer diameter of three-sixteenths of an inch (i.e., 3/16" OD).

Figure 5:
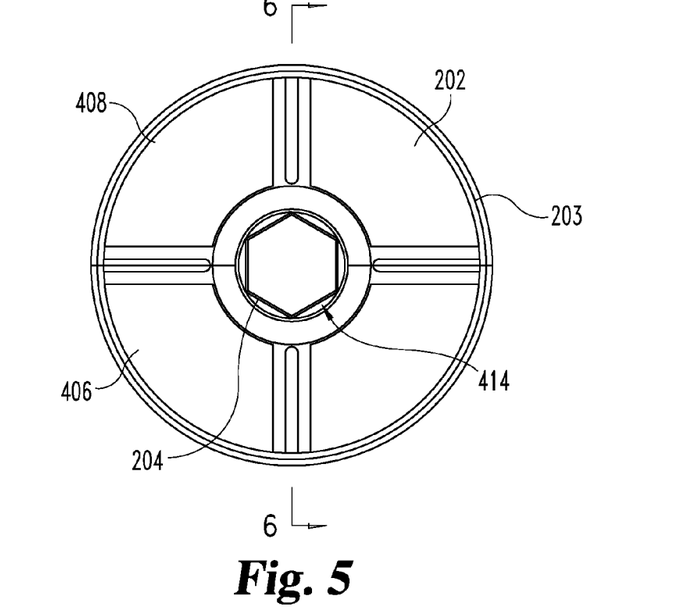
FIG. 5 is an end view of the FIG. 4 end hub.
Figure 6:
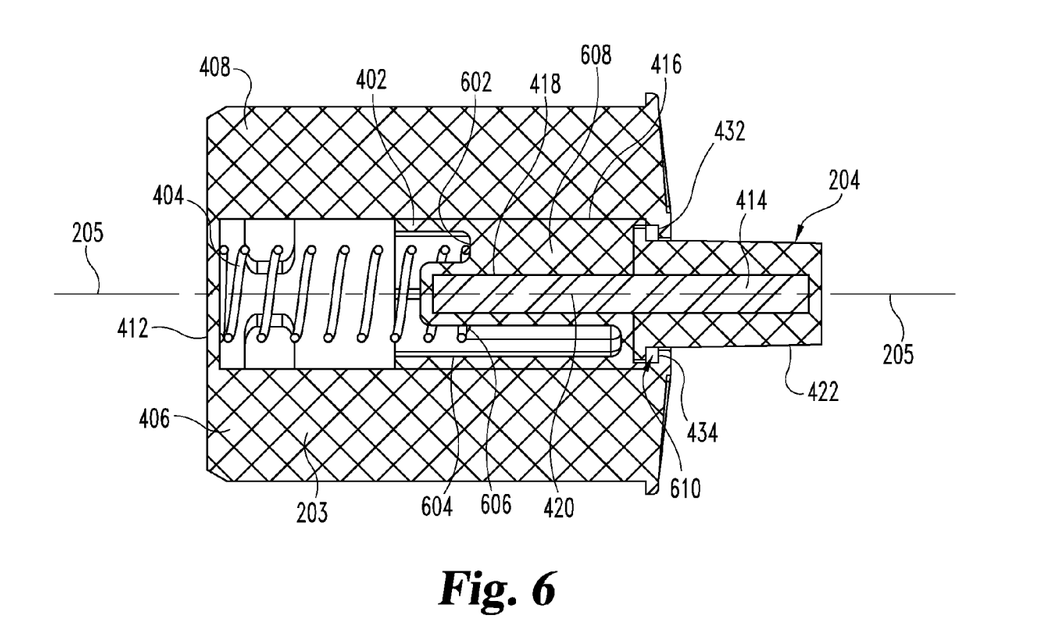
FIG. 6 is a cross-sectional view of the end hub as taken along line 6-6 in FIG. 5.

FIG. 5 shows an end view of the end hub 202 when assembled, and FIG. 6 shows a cross-sectional view of the end hub 202 as taken along line 6-6 in FIG. 5. As can be seen in FIG. 6, the end of the spring 404, which is opposite the spring support wall 412, is received inside a spring cavity 602 in the bearing 402. The spring cavity 602 is formed between an outer casing 604 that defines the outer surface 416 of the bearing 402 and an inner casing 606 that defines the pin opening 418 in which the pin 420 of the axle stub 204 is received. Ribs 608 extend radially between the outer casing 604 and the inner casing 606 to connect the casings 604, 606 together. The ribs 608 in the illustrated embodiment only extend for a portion of the length of the bearing 204 such that the spring 404 is able to be seated inside the bearing 402. It should be appreciated that in other variations the spring 404 can be seated or otherwise coupled to the bearing 402 in other manners (or not at all). For instance, the spring 404 in another embodiment simply presses against a flat end of the bearing 402.

As shown in FIG. 6, the spring 404 biases the bearing 402 so that the head 422 of the axle stub 204 normally extends from the housing 203. When the axle stub 204 is extended, the bearing 402 abuts against the engagement flange 432 of the housing 203. The notch portion 434 in the engagement flange 432 and the retention flange cavity 430 in the bearing 402 form a flange cavity 610. The space provided by the flange cavity 610 aids in reducing friction between the axle stub 204 and the bearing 402 as well as assists with compensating for tolerance issues between the rails 104 of the frame 102. As noted before, the spring in conventional sprung pin type roller designs directly contacts the axle stub so as to bias the axle stub into an extended state. This arrangement of the spring contacting the axle stub in turn creates additional friction and wear when the roller is rotated. With the arrangement illustrated in FIG. 6, the spring 404 does not directly contact the axle stub 204, thereby reducing the associated friction and wear. As shown, the spring 404 biases the bearing 402 which in turn biases the axle stub 204. Again, the bearing 402 is keyed with the bearing cavity 410 so that the bearing 402 is unable to rotate, but the bearing 402 is able to move in a longitudinal direction along the axis 205. To put it another way, the bearing 402 is sandwiched between the spring 404 and the axle stub 204 such that the axle stub 204 is free to rotate relative to the bearing 402 while at the same time the bearing 402 is able to longitudinally move so as to facilitate extension and retraction of the axle stub 204.

Figure 7:
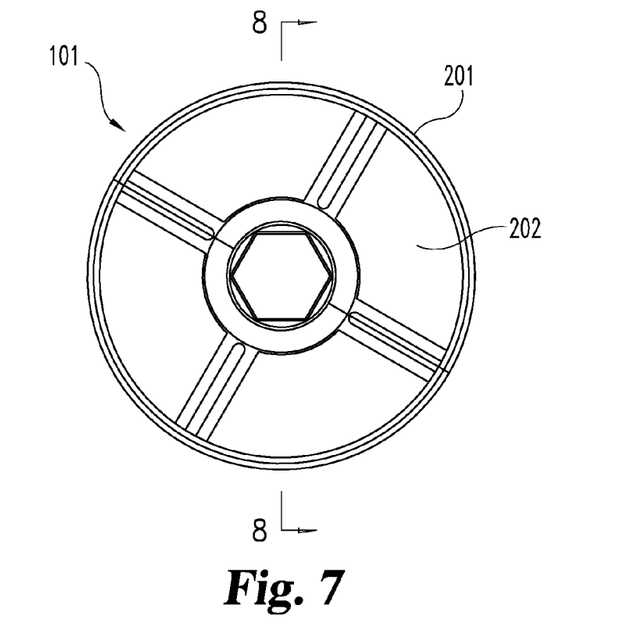
FIG. 7 is an end view of the FIG. 2 roller.
Figure 8:
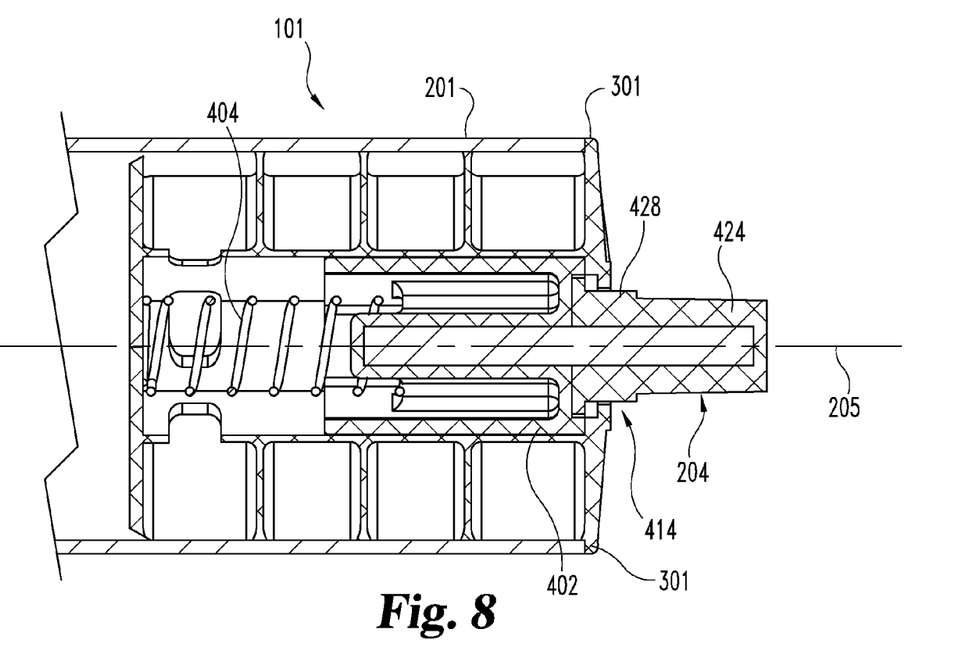
FIG. 8 is a cross-sectional view of the roller as taken along line 8-8 in FIG. 7.

FIG. 7 shows an end view of the roller 101 with the end hub 202 inserted into the roller tube 201. FIG. 8 is a cross-sectional view of the roller 101 as taken along line 8-8 in FIG. 7. During installation, the spring 404 is compressed as the axle stub 204 is pushed longitudinally along the axis 205 into the housing 203. Once the roller 101 is properly positioned in the frame 102 (FIG. 1), the axle stub 204 is released such that the spring 404 pushes the axle stub 204 to extend and engage the frame 102. When the axle stub 204 is extended, as is shown in FIG. 8, the collar 426 of the axle stub 204 is positioned in the opening 414 of the housing 203, thereby facilitating smooth rotation of the roller 101. During operation, the roller 101 is then able to rotate about the about the axle stub 204.

Figure 9:
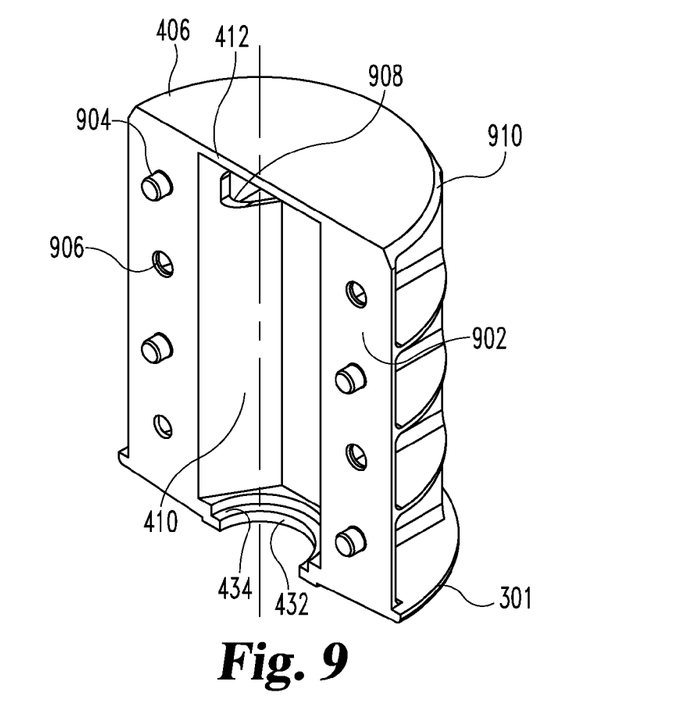
FIG. 9 is a perspective view of a shell used in the FIG. 4 end hub.
Figure 10:
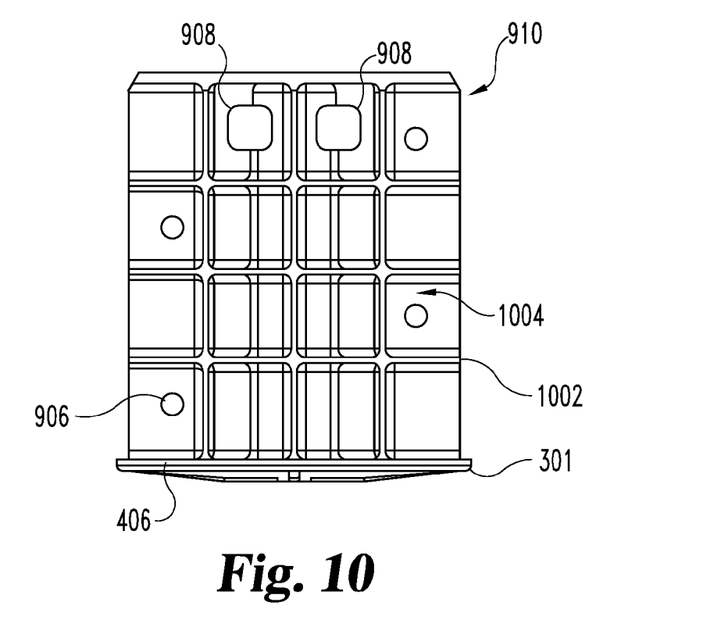
FIG. 10 is a back view of the FIG. 9 shell.
Figure 11:
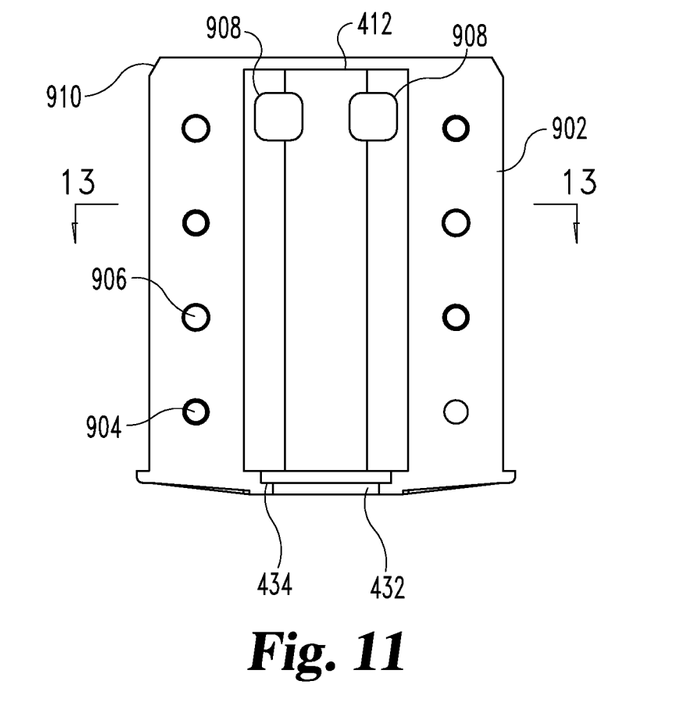
FIG. 11 is a front view of the FIG. 9 shell.
Figure 12:
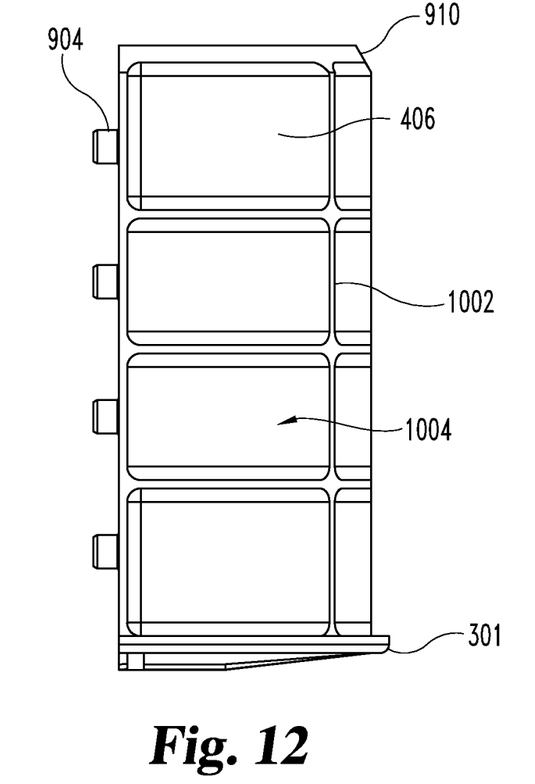
FIG. 12 is a side view of the FIG. 9 shell.
Figure 13:
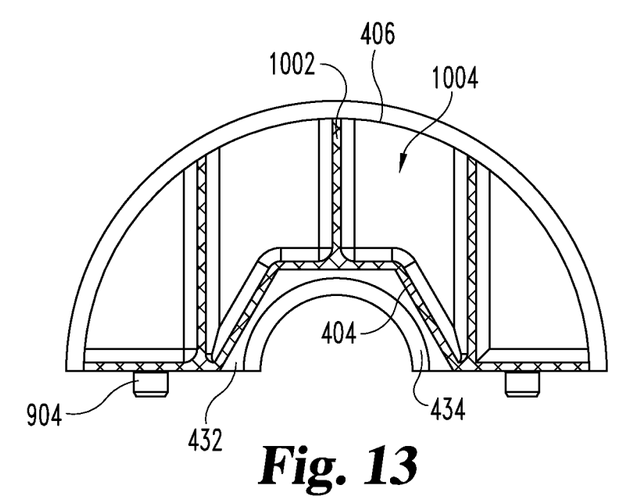
FIG. 13 is a cross-sectional view of the shell as taken along line 13-13 in FIG. 11.

As mentioned before, the clam-shell design of the housing 203 of the end hub 202 allows the housing to be manufactured inexpensively while also permitting the complex internal shapes within the housing 203, such as those formed along the bearing cavity 410. FIG. 9 shows a perspective view of one of the shells 406. FIGS. 10, 11, and 12 respectively show back, front, and side views of the shell 406. FIG. 13 shows a cross-sectional view of the shell 406 as taken along line 13-13 in FIG. 11. Again, the clam-shell design allows complex structures to be inexpensively manufactured using injection molding or similar processes. Looking at FIGS. 9, 11, and 13, this manufacturing technique facilitates the formation of complex structures, such as the bearing cavity 410, the annular flange 301, and the notched portion 434 on the engagement flange 432. Located around the bearing cavity 410, the shells 406, 408 have mating surfaces 902 where the shells 406, 408 are joined together.

To align the shells 406, 408 together, the mating surfaces 902 in the illustrated embodiment have one or more alignment pins 904 configured to mate with one or more corresponding alignment openings 906. In the illustrated embodiment, the alignment pins 904 have a cylindrical shape, but the alignment pins can be shaped differently in other embodiments (e.g., have a box or rectangular shape). It should be appreciated that other alignment and/or securing structures also can be used. For instance, the pins 904 can be reconfigured to mechanically secure the shells together and/or adhesives can be used. With the two shells 406, 408 being identical, tooling costs can be reduced. Alternatively or additionally, once assembled, the roller tube 201 can hold the shells 406, 408 together. During use, debris can build up inside the bearing cavity 410 which in turn can jam or otherwise damage the end hub 202. To address this issue, the shells 406, 408 have one or more debris openings 908 that facilitate debris removal from the bearing cavity 410. As shown, the debris openings 908 are located near the end of the bearing cavity 410 by the spring support wall 412. With this location, as the bearing 402 reciprocates in the bearing cavity 410 as the axle stub 204 is compressed and extended, the bearing 402 pushes the debris towards and/or out the debris openings 908. To facilitate insertion of the end hub 202 into the roller tube 201, the shells 406, 408 have a chamfer 910 at one end, as is shown in FIGS. 9, 10, 11, and 12. Alternatively or additionally, the housing 203 can include a slight taper and/or other features to facilitate insertion into the roller tube 201. Turning to FIGS. 10, 12, and 13, in order to reduce the amount of material needed to produce the housing 203, the shells 406, 408 include ribs 1002 with voids 1004 in between that form the exterior of the housing 203. Using the ribs 1002 ensures the housing 203 is both lightweight and strong.

This unique four component, clamshell design for the end hub 202 helps to simplify assembly and reduce manufacturing as well as maintenance costs. A technique for manufacturing the rollers 101 and the end hub 202 will now be initially described with reference to FIGS. 2, 3, and 4. During manufacturing, the bearing 402 along with the shells 406, 408 are produced via thermoplastic injection molding processes. In a somewhat similar fashion, a thermoplastic is injection molded around one end of the steel pin 420 so as to form the head 422 of the axle stub 204. In one example, the spring 404 is a standard coil spring that is readily purchased off the shelf. It should be recognized that other techniques and processes, besides injection molding, can be used to form these components. For instance, subtractive techniques, like computer numerical control (CNC) machining, and/or additive techniques, like three-dimensional (3D) printing, can be used to produce these components. Moreover, other materials besides plastics and metals can be used to make these parts.

Looking again at FIG. 4, to assemble the end hub 202, the spring 404 is positioned inside the bearing cavity 410 of one of the shells 406. The pin 420 of the axle stub 204 is inserted into the pin opening 418 of the bearing 402. The combined axle stub 204 and bearing 402 subassembly is then positioned inside the bearing cavity 410 of the shell 406 along with the spring 404. One end of the spring 404 is received inside the spring cavity 602 of the bearing 402 (FIG. 6). The retention flange 428 of the axle stub 204 is positioned inside the bearing cavity 410 so that the engagement flange 432 of the shell 406 is able to retain the axle stub 204 with the head 422 of the axle stub extending through the axle stub opening 414. In this state, the bearing 402 is then sandwiched between the spring 404 and the axle stub 204. In another variation of this assembly technique, the axle stub 204, bearing 402, and spring 404 are loaded into the bearing cavity 410 of one of the shells 406 individually. This individual loading can occur in any order such that the axle stub 204 or the bearing 402 is first loaded before the spring 404 is loaded into the bearing cavity 410. In still yet another variation, the axle stub 204, bearing 402, and spring 404 can be pre-assembled together before the combined assembly is loaded into the bearing cavity 410 of the shell 406. It is envisioned that other subassembly combinations can be created before insertion into the bearing cavity 410. Alternatively or additionally, various components can be integrated together to form a single unit. For example, the spring 404 can be integrated into the bearing 402 and/or the shells 406, 408. For instance, the spring 404 can be an integral plastic spring formed at one end of the bearing 402 during injection molding. Once the axle stub 204, the bearing 402, and the spring 404 are loaded into the bearing cavity 410, the shells 406, 408 are brought together so as to form the housing 203. As noted before with respect to FIG. 9, the alignment pins 904 are received in the alignment holes 906 when the shell 406, 408 are brought together so as to ensure proper alignment. Together the shells 406, 408 form the completed bearing cavity 410 where the axle stub 204, the bearing 402, and the spring 404 are disposed in the housing 203 of the end hub 202. In one example, the shells 406, 408 are joined together, such as via an adhesive and/or welding, but the shells 406, 408 can be joined together in other manners or not at all. In another example, the shells 406, 408 are held together with the roller tube 201. Referring to FIGS. 2 and 3, once assembled, the end hub 202 is inserted into the hub opening 207 of the roller tube 201. The end hub 202 can be held in place via friction between the end hub 202 and the roller tube 201. Alternatively or additionally, the end hub 202 can be held in place inside the roller tube 201 in other ways, such as with an adhesive. In one variation, both ends of the roller 101 have end hubs 202 with retractable axle stubs 204. However, in other variations, only one end of the roller 101 has an axle stub 204 that is retractable while the other end has an axle stub that is fixed or non-retractable (but is able to rotate, if needed).

A technique for replacing a roller 101 in the frame with a new roller 101 will now be described with reference to FIGS. 14-21. FIGS. 14, 16, 18, and 20 illustrate cross-sectional views of the roller 101 as the roller 101 is inserted into the frame 102. FIGS. 15, 17, 19, and 21 show the corresponding side views of the insertion stages illustrated in FIGS. 14, 16, 18, and 20, respectively. Looking at FIG. 15, each rail 104 of the frame 102 has a series of one or more axle receptacles 1501 in which a portion of the rail engagement section 424 of the axle stub 204 (FIG. 4) is received. In the illustrated embodiment, the axle receptacle 1501 has a hexagonal shape, but the axle receptacle 1501 can be shaped differently in other embodiments. Moreover, the axle receptacle 1501 in the illustrated embodiment is located near the top of the rail 104 so as to permit items wider than the frame 102 to roll on the rollers 101, but it is envisioned that the rollers 101 can be positioned elsewhere on the rails 102, such as in the middle or near the bottom of the rails 102. Moreover, the spacing between the axle receptacles 1501 can be different than is illustrated.

Figure 14:
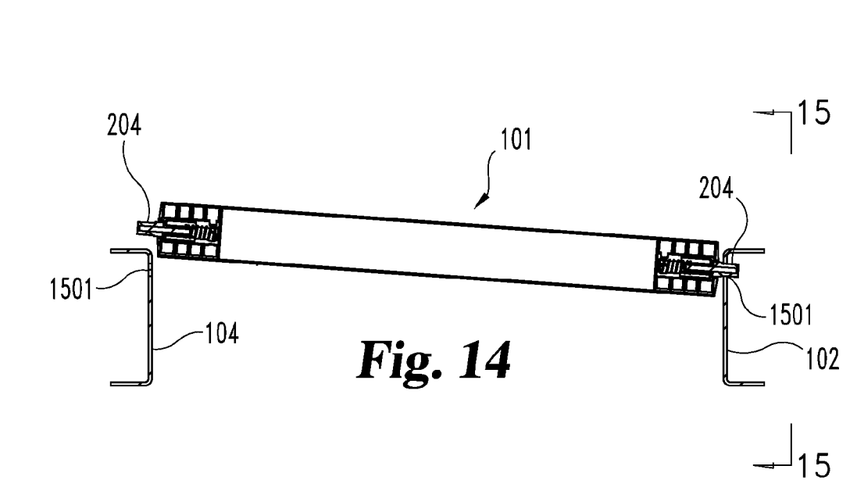
FIG. 14 is a cross-sectional view of the FIG. 2 roller and a conveyor frame in a first installation position.
Figure 15:
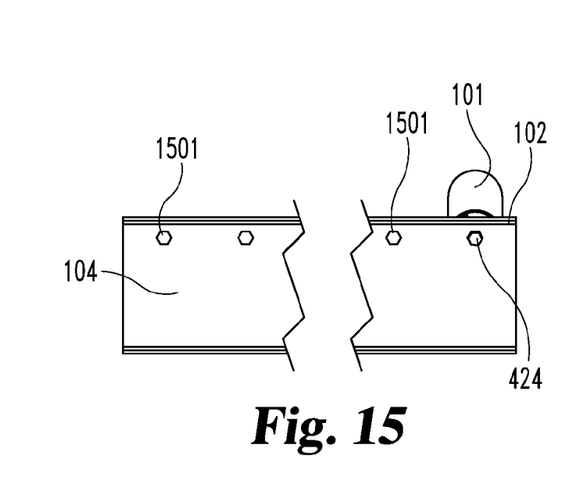
FIG. 15 is a side view of the roller and conveyor frame in the first installation position shown in FIG. 14.
Figure 16:
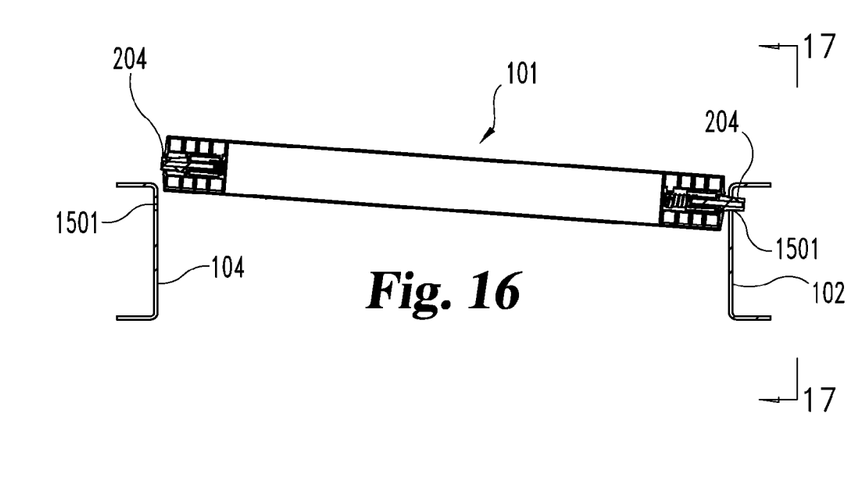
FIG. 16 is a cross-sectional view of the roller and a conveyor frame in a second installation position.
Figure 17:
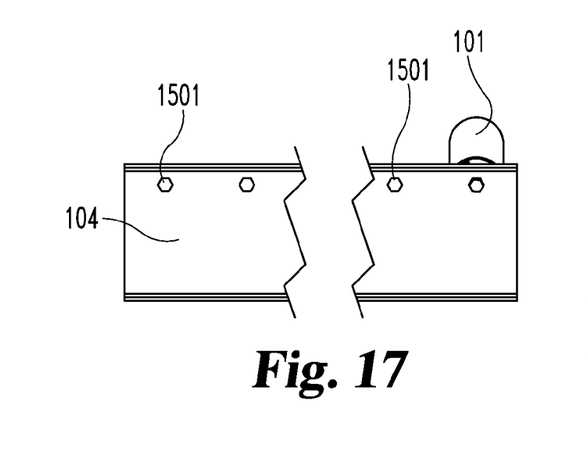
FIG. 17 is a side view of the roller and conveyor frame in the second installation position shown in FIG. 16.
Figure 18:
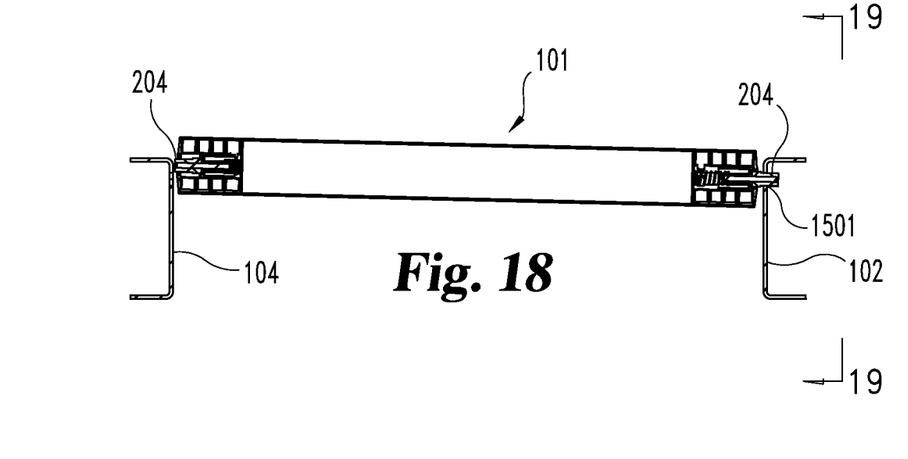
FIG. 18 is a cross-sectional view of the roller and a conveyor frame in a third installation position.
Figure 19:
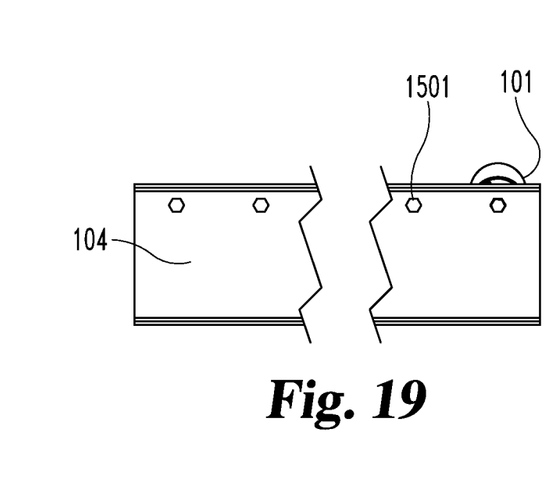
FIG. 19 is a side view of the roller and conveyor frame in the third installation position shown in FIG. 18.
Figure 20:
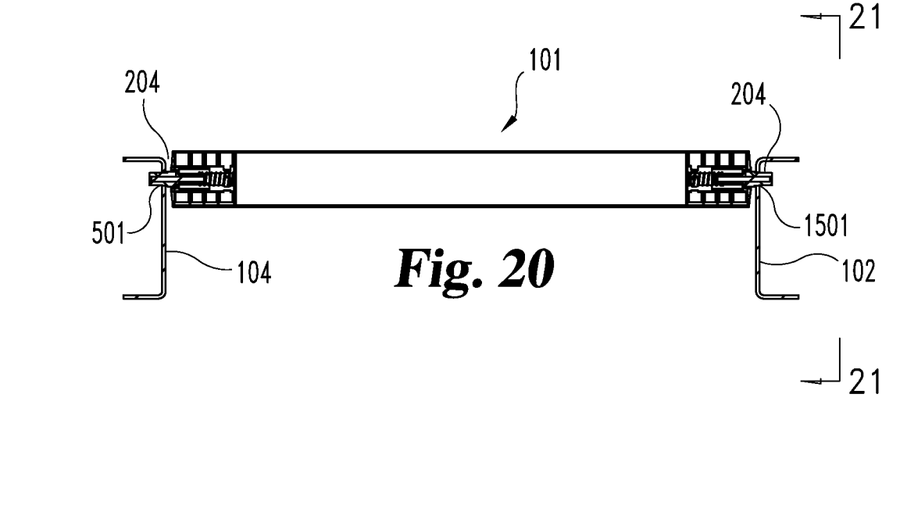
FIG. 20 is a cross-sectional view of the roller and a conveyor frame in a fourth installation position.
Figure 21:
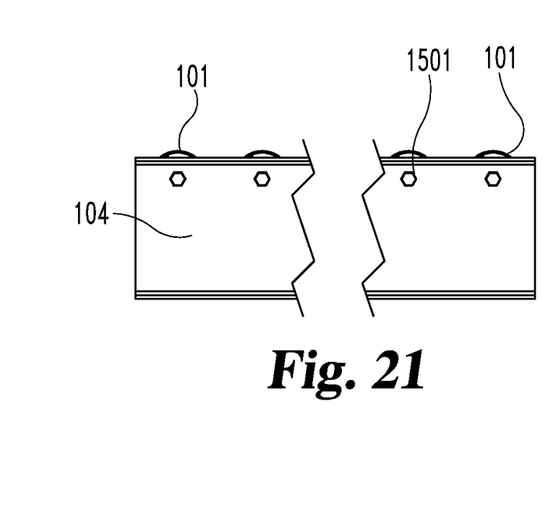
FIG. 21 is a side view of the roller and conveyor frame in the fourth installation position shown in FIG. 20.

To insert roller 101 into the frame 102, the axle stub 204 at one end of the roller 101 is inserted into the axle receptacle 1501, as is shown in FIGS. 14 and 15. Looking at FIGS. 16 and 17, the axle stub 204 at the other end of the roller 101 is pushed in such that axle stub 204 is mostly situated inside the end hub 202. The axle stub 204 is retracted to an extent so as to provide clearance for inserting the roller 101 into the frame 102. If needed, the other axle stub 204 that is already inserted in the axle receptacle 1501 can be pressed in so as to provide additional clearance for the roller 101. Turning to FIGS. 18 and 19, with the axle stub 204 now depressed, the end of the roller 101 is lowered until the axle stub 204 is aligned with the coinciding receptacle 1501. As noted before, the spring 404 is biased so as to extend the axle stub 204. While the end of the roller 101 is lowered, the axle stub 204 can be released once the axle stub 204 reaches the frame 102 such that the axle stub 204 is able to ride along the inner surface of the rail 104. Once axle stub 204 reaches the axle receptacle 1501, the spring 404 causes the axle stub 204 to pop into the axle receptacle 1501, as is shown in FIGS. 20 and 21. In another variation, the axle stub 204 is held in a retracted state until the axle stub 204 is aligned with axle receptacle 1501 and the axle stub 204 is released such that the spring 404 extends the axle stub 204 into the axle receptacle 1501. In still yet another variation, the axle stubs 204 at both ends of the roller 101 are simultaneously compressed and released during insertion of the roller 101 into the frame 102.

As alluded to before, having the spring 404 biasing the bearing 402 rather than contacting the axle stub 204 allows the axle stub 204 to rotate more freely due to reduced friction. This in turn allows the axle stub 204 to be easily rotated into position for insertion into the axle receptacle 1501. In the previous designs where the spring directly contacts the axle stub, it was found that the axle stubs were harder to rotate into position during insertion because of the greater friction created by the axle stub being compressed against the spring. On the other hand, the roller 101 shown in the drawings does not experience these issues because the bearing 402 acts as a buffer between the linear compression movement of the spring 404 and the rotary movement of the axle stub 204. This ability to easily rotate can be especially helpful when the rail engagement section 424 of the axle stub 204 and/or the axle receptacle 1501 have a non-circular or keyed shape requiring a specific rotational orientation, such as the hexagonal shape of the rail engagement section 424 and axle receptacle 1501 shown in the drawings.

With the roller 101 now installed in the frame, as is depicted in FIGS. 20 and 21, the roller conveyor system 100 (FIG. 1) can be used. The axle stubs 204 in the illustrated embodiment are shaped to fit within receptacles 1501 such that any rotational motion is restricted, but in other embodiments, the rotational movement need not be restricted. In the illustrated configuration, the roller tube 201 is free to rotate about the axis 205 as axle stubs 204 are held stationary. When a force is imparted on roller 101 tending to cause that roller to rotate about the axis 205, the axle stubs 204 on both ends of the roller 101 are held stationary and bearing 402 rotates about pin 420. The small size of the pin 420 relative to the head 422 of the axle stub 204 results in reduced friction between the pin 420 and the bearing 402. This limited surface friction results in correspondingly limited frictional losses during operation of the rollers 101. Furthermore, with the spring 404 abutting against the bearing 402, rather than the axle stub 204, frictional losses between the pin 420 of the axle stub 204 and the spring 404 are eliminated.

The illustrated design also helps to simplify servicing. The rollers 101 can be readily removed from the frame 102 by simply compressing one or both of the axle stubs 204 and pulling the roller 101 from the frame. During operation of the conveyor system 100, dirt and contaminants can enter into the end hub 202 and/or the roller tube 201. The relative ease of removal of the rollers 101 allow the rollers 101 to be easily removed, replaced, and/or serviced. When contaminants enter the end hub 202, the contaminants may be expelled through debris openings 908 via air pressure, through the use of gravity, and/or in other manners. As noted above, the compression of the axle stub 204 can also cause the bearing 402 to push the contaminants out the debris openings 908. Faulty end hubs 202 can be readily swapped out for new ones by simply pulling the old ones from the roller tube 201 and inserting new ones. With the four component design, components within the end hub 202, such as the bearing 402 and/or spring 404, can be easily replaced. Once the roller 101 has been serviced (or a replacement roller 101 is acquired), the roller 101 can be reinserted into the frame in the manner as described above with reference to FIGS. 14-21.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An apparatus, comprising:
   a roller including
      an axle stub about which the roller rotates, the axle stub being retractable in a linear direction to facilitate replacement of the roller,
      a bearing coupled to the axle stub in a rotatable manner, the bearing being moveable in the linear direction within the roller as the axle stub retracts,
      wherein the axle stub includes a pin,
      wherein the bearing defines an axle pin opening in which the pin of the axle stub is received, and
      wherein the axle stub is configured to rotate relative to the bearing.

2. The apparatus of claim 1, further comprising a conveyor frame to which the roller is secured via the axle stub.

3. The apparatus of claim 1, further comprising:
   a housing defining a bearing cavity in which the bearing is disposed, wherein the bearing cavity is longer than the bearing to allow the bearing to slide in a linear direction within the bearing cavity.

4. The apparatus of claim 1, further comprising:
   a biasing mechanism biasing the bearing so that the axle stub is in an extended position; and wherein the bearing is configured to move counter to a biasing force of the biasing mechanism during retraction of the axle stub.

5. The apparatus of claim 1, further comprising:
a biasing mechanism configured to bias the axle stub in an extended position.

6. The apparatus of claim 5, wherein the bearing is sandwiched between the biasing mechanism and the axle stub.

7. The apparatus of claim 5, wherein the biasing mechanism includes a spring.

8. The apparatus of claim 7, wherein the bearing includes a spring cavity in which one end of the spring is received.

9. The apparatus of claim 1, further comprising:
the axle stub including
a head,
a pin extending from the head, the pin being rotatably received in the bearing, and
wherein the pin has an outer diameter that is smaller than an outer diameter of the head.

10. The apparatus of claim 9, wherein the outer diameter of the pin is 3/16 of an inch.

11. The apparatus of claim 9, wherein the head of the axle stub includes a collar section that is cylindrical and a rail engagement section having a hexagonal cross-sectional shape.

12. The apparatus of claim 1, wherein:
the bearing and axle stub are moveable together in the linear direction from an extended position to a retracted position;
the axle stub extends from the roller when at the extended position; and
the axle stub is at least partially retracted inside the roller when at the retracted position.

13. The apparatus of claim 12, further comprising:
a housing defining a bearing cavity in which the bearing is disposed, wherein the bearing cavity is longer than the bearing to allow the bearing to slide in a linear direction within the bearing cavity.

14. The apparatus of claim 12, further comprising:
a biasing mechanism biasing the bearing so that the axle stub is in an extended position; and
wherein the bearing is configured to move counter to a biasing force of the biasing mechanism during retraction of the axle stub.

15. The apparatus of claim 1, further comprising:
a housing defining a bearing cavity in which the bearing is disposed; and
the bearing being configured to slide in the linear direction within the bearing cavity.

16. The apparatus of claim 15, wherein the housing defines one or more debris openings positioned at an end of the bearing cavity opposite the axle stub.

17. The apparatus of claim 15, wherein the bearing and the bearing cavity include a keying structure for allowing the bearing to slide in the linear direction within the bearing cavity and prevent the bearing from rotating relative to the housing.

18. The apparatus of claim 17, wherein the keying structure includes the bearing and the bearing cavity each having a hexagonal cross-sectional shape.

19. The apparatus of claim 15, further comprising:
the housing defining an axle stub opening through which a portion of the axle stub extends, the housing having an engagement flange surrounding the axle stub opening; and
the axle stub includes a retention flange engaging the engagement flange to retain the axle stub in the housing.

20. The apparatus of claim 19, further comprising:
the bearing defining a retention flange cavity in which the retention flange of the axle stub is received;
the engagement flange of the housing defining a notch portion sized and shaped to receive at least part of the retention flange of the axle stub; and
wherein the notch portion in the engagement flange and the retention flange cavity in the bearing form a retention flange cavity in which the retention flange of the axle stub is disposed.

21. The apparatus of claim 15, wherein the housing has a clamshell configuration.

22. The apparatus of claim 21, wherein the clamshell configuration includes at least two shells joined together to form the housing.

23. The apparatus of claim 22, wherein the shells include one or more alignment pins and openings for aligning the shells together.

24. A method of manufacturing a roller, comprising:
inserting a pin of an axle stub into a pin opening of a bearing; and
loading the bearing into a bearing cavity of a housing, wherein the bearing cavity is longer than the bearing to allow the bearing to slide in a linear direction within the bearing cavity.

25. The method of claim 24, wherein said inserting occurs after said loading.

26. The method of claim 24, comprising:
securing the housing to one end of a roller tube.

27. The method of claim 24, wherein said inserting occurs before said loading.

28. The method of claim 24, wherein said loading includes positioning a spring inside the bearing cavity with the bearing located in between the spring and the axle stub.

29. The method of claim 24, wherein said loading includes securing at least two shells together to form the housing.

30. The method of claim 24, further comprising:
forming the bearing cavity with a key structure to prevent rotation of the bearing relative to the bearing cavity while permitting movement of the bearing in the linear direction.

31. The method of claim 30, wherein the bearing cavity and the bearing have hexagonal cross-sectional shapes.

32. A method of installing a roller into a conveyor frame, comprising:
retracting an axle stub of the roller by compressing the axle stub against a bearing in which a portion of the axle stub is rotatably received, wherein the bearing is disposed in a bearing cavity that is longer than the bearing, wherein the bearing moves in a retraction direction within the bearing cavity during said retracting, wherein the bearing and axle stub move together in the retraction direction from an extended position to a retracted position during said retracting, wherein the axle stub is at least partially retracted inside the roller when at the retracted position;
aligning the axle stub with an axle stub receptacle in the conveyor frame; and
inserting the axle stub into the axle stub receptacle by extending the axle stub in an extension direction, wherein the bearing moves with the axle stub in the extension direction during said inserting.

33. The method of claim 32, wherein said inserting includes rotating the axle stub to align with the axle stub receptacle.

34. The method of claim 32, further comprising:
wherein the axle stub includes a pin, wherein the bearing defines an axle pin opening in which the pin of the axle stub is received, and rotating the axle stub relative to the bearing.

35. The method of claim 32, further comprising:

wherein the bearing is biased towards the extension direction by a biasing mechanism; and wherein said inserting includes extending the axle stub in the extension direction with the biasing mechanism.

36. The method of claim 35, further comprising:

wherein the biasing mechanism includes a spring;

wherein the bearing is disposed between the spring and the axle stub;

wherein said retracting includes compressing the spring with the bearing by pushing the axle stub in the retraction direction; and wherein said inserting includes releasing the spring, wherein the spring pushes the bearing and the axle stub in the extension direction during said inserting.

37. An apparatus, comprising:

a roller including an axle stub about which the roller rotates, the axle stub being retractable in a linear direction to facilitate replacement of the roller, a bearing coupled to the axle stub in a rotatable manner, the bearing being moveable in the linear direction within the roller as the axle stub retracts, a housing defining a bearing cavity in which the bearing is disposed, the bearing being configured to slide in the linear direction within the bearing cavity, and wherein the bearing and the bearing cavity include a keying structure for allowing the bearing to slide in the linear direction within the bearing cavity and prevent the bearing from rotating relative to the housing.

38. The apparatus of claim 37, wherein the keying structure includes the bearing and the bearing cavity each having a hexagonal cross-sectional shape.

39. An apparatus, comprising:

a roller including an axle stub about which the roller rotates, the axle stub being retractable in a linear direction to facilitate replacement of the roller, and a bearing coupled to the axle stub in a rotatable manner, the bearing being moveable in the linear direction within the roller as the axle stub retracts, a housing defining a bearing cavity in which the bearing is disposed; and the bearing being configured to slide in the linear direction within the bearing cavity, and wherein the housing defines one or more debris openings positioned at an end of the bearing cavity opposite the axle stub.

40. An apparatus, comprising:

a roller including an axle stub about which the roller rotates, the axle stub being retractable in a linear direction to facilitate replacement of the roller, and a bearing coupled to the axle stub in a rotatable manner, the bearing being moveable in the linear direction within the roller as the axle stub retracts, a housing defining a bearing cavity in which the bearing is disposed; and the bearing being configured to slide in the linear direction within the bearing cavity, the housing defining an axle stub opening through which a portion of the axle stub extends, the housing having an engagement flange surrounding the axle stub opening, the axle stub includes a retention flange engaging the engagement flange to retain the axle stub in the housing, the bearing defining a retention flange cavity in which the retention flange of the axle stub is received, the engagement flange of the housing defining a notch portion sized and shaped to receive at least part of the retention flange of the axle stub, and wherein the notch portion in the engagement flange and the retention flange cavity in the bearing form a retention flange cavity in which the retention flange of the axle stub is disposed.

41. An apparatus, comprising:

a roller including an axle stub about which the roller rotates, the axle stub being retractable in a linear direction to facilitate replacement of the roller, a bearing coupled to the axle stub in a rotatable manner, the bearing being moveable in the linear direction within the roller as the axle stub retracts, and the axle stub including a head, a pin extending from the head, the pin being rotatably received in the bearing, and wherein the pin has an outer diameter that is smaller than an outer diameter of the head.

42. The apparatus of claim 41, wherein the outer diameter of the pin is 3/16 of an inch.

43. The apparatus of claim 41, wherein the head of the axle stub includes a collar section that is cylindrical and a rail engagement section having a hexagonal cross-sectional shape.

* * * * *